United States Patent [19]

Kabacoff et al.

[11] Patent Number: 5,460,866
[45] Date of Patent: Oct. 24, 1995

[54] VIBRATION DAMPING STRUCTURAL LAMINATE

[75] Inventors: Lawrence T. Kabacoff, Columbia; Chak-Pan Wong, Silver Spring; Arthur E. Clark, Adelphi, all of Md.

[73] Assignee: The United States of America as represented by the Secretary of the Navy, Washington, D.C.

[21] Appl. No.: 576,918

[22] Filed: Sep. 4, 1990

[51] Int. Cl.⁶ .................................................. B32B 9/00
[52] U.S. Cl. .............................. 428/194; 52/172; 52/308; 52/171.1; 156/101; 428/320.2
[58] Field of Search ................. 52/171, 172, 308; 428/194; 156/101

[56] References Cited

U.S. PATENT DOCUMENTS

| | | | |
|---|---|---|---|
| 4,278,726 | 7/1981 | Wieme | 428/229 |
| 4,321,777 | 3/1982 | Sauret et al. | 52/308 |
| 4,622,249 | 11/1986 | Bowser | 428/34 |

Primary Examiner—Patrick J. Ryan
Assistant Examiner—Kam F. Lee
Attorney, Agent, or Firm—Jacob Shuster

[57] ABSTRACT

A structural laminate of rigid layers separated by very thin layers of viscous fluid. The viscous fluid adheres to the confronting surfaces of adjacent rigid layers and is maintained in layered alignment within the laminate to ordinarily prevent flexural vibration and provide vibration overdampening to cope with flexural deforming forces.

8 Claims, 1 Drawing Sheet

VIBRATION DAMPING STRUCTURAL LAMINATE

BACKGROUND OF THE INVENTION

This invention relates generally to laminated structural material and in particular to composite structural sheets having flexural vibration dampening properties.

Structural devices having multi-layer arrangements with vibration dampening properties or functions are well known in the art, as exemplified by the disclosures in U.S. Pat. Nos. 4,278,726, 4,609,960 and 4,790,521 to Wieme, Yamauchi et al. and Ide et al., respectively. According to the Wieme patent, a structural laminate is disclosed having a central rigid core layer sandwiched between visco-elastic layers to provide energy absorbing capability. According to the Ide et al. patent, vibrations are damped between rigid plates by means of an elastic rubber block and a viscous fluid sealed within a cavity formed in the elastic block to resist those of the vibrations causing shear.

The vibration dampening techniques associated with the foregoing prior art are unsuitable for use with relatively thin laminates such as those which rely on the structural composite strength of a stack of rigid material layers. Where a viscous fluid is used to resist shearing vibrations as disclosed in the aforementioned Ide et al. patent for example, the vibration dampening arrangement is necessarily bulky and therefore unsuitable for thin structural sheet arrangements.

It is therefore an important object of the present invention to provide a relatively thin sheet material having flexural vibration dampening properties enabling construction of structural components therefrom with a high ratio of dampening to sheet material volume so as to cope with vibration problems in various critical environments.

SUMMARY OF THE INVENTION

In accordance with the present invention, a structural sheet laminate formed by a stack of rigid layers by reason of which a desired strength is achieved to resist flexural deforming forces under given design conditions. The rigid layers or films are separated by very thin layers of non-elastic viscous fluid which adheres to the cross-sectionally confronting surfaces of adjacent rigid layers. Such adhesion of the viscous fluid and its confinement by means of edge bonding, for example, between peripheral portions of the rigid layers maintains the viscous fluid in its thin layer-alignment relationship to the rigid layers so as to enable such viscous fluid to perform vibration prevention and overdampening functions under the environmental conditions for which the sheet laminate is structurally designed.

BRIEF DESCRIPTION OF THE DRAWING FIGURES

Other objects, advantages and novel features of the invention will become apparent from the following detailed description of the invention when considered in conjunction with the accompanying drawing wherein.

DETAILED DESCRIPTION OF THE PREFERRED EMBODIMENT

Figure 1:
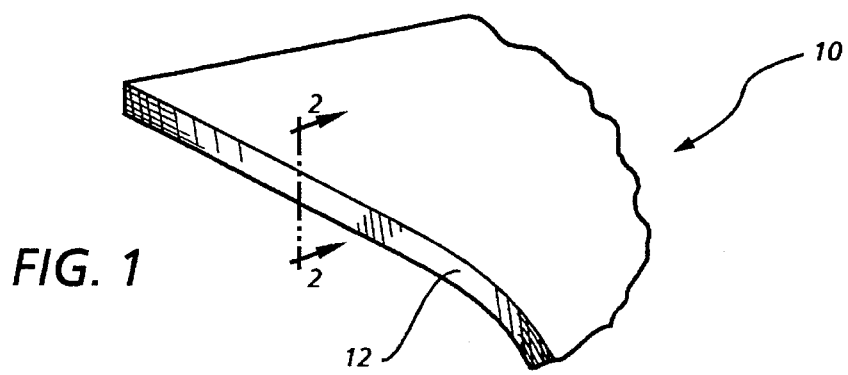
FIG. 1 is a perspective view of a portion of a structural sheet laminate constructed in accordance with the present invention.

Referring now to the drawing in detail, FIG. 1 illustrates a portion of a structural sheet laminate, generally referred to by reference numeral 10, constructed in accordance with the present invention. The structural sheet 10 may be in any desired peripheral shape and/or bonded to other structural members to form some useful assembly. The sheet laminate 10 or portions thereof may be flat or conform to various curvatures. Except for exposed peripheral edge portions 12, the sheet laminate is internally uniform in cross-section.

Figure 2:
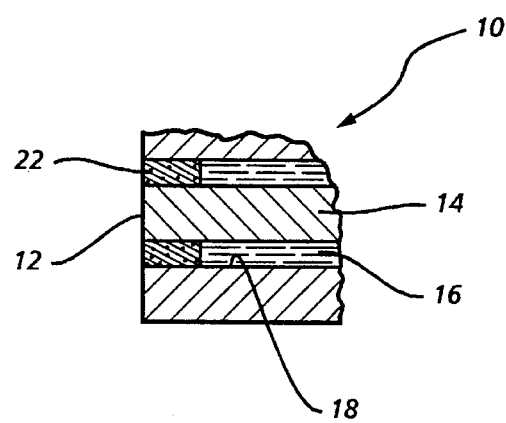
FIG. 2 is an enlarged partial section view taken substantially through a plane indicated by section line 2—2 in FIG. 1.

As shown in FIG. 2, the sheet 10 is formed from a plurality of rigid layers 14 preferably made of a metallic composition such as metallic glass or aluminum/graphite material having the desired structural properties. The layers 14 will accordingly undergo flexural deformation in response to forces of sufficient magnitude applied in directions generally transverse to the general surface plane of sheet 10. The vibrations otherwise resulting from such deformation are prevented by vibrational overdampening in accordance with the present invention by means of very thin layers or films 16 of viscous fluid disposed between confronting shear surfaces 18 of adjacent layers 14 as shown in FIG. 2. The viscous fluid according to one embodiment is in the form of a liquid which acts as an adhesive with respect to the confronting surfaces 18 and has the requisite energy dissipation property to achieve the aforementioned overdampening without affecting vibrational shear in the plane of the sheet laminate 10 substantially parallel to surfaces 18. The viscous liquid of layers 16 is selected from fluids having a wide variety of viscosities to suit different temperature environments, including but not limited to a commercial product known as "melt mount".

Pursuant to the present invention, the viscous fluid layers 16 are made as thin as possible, in the order of less than 0.0002 inch, to facilitate fabrication as well as to minimize the total thickness of the sheet laminate 10 necessary to meet structural requirements and other installational demands. Thus, the thinness of the fluid layers 16 contributes to the prevention of flexure induced vibrations caused for example by forces below some design limit magnitude, and yet function to overdamp vibrations so as to cope with forces above the design limit.

Figure 3:
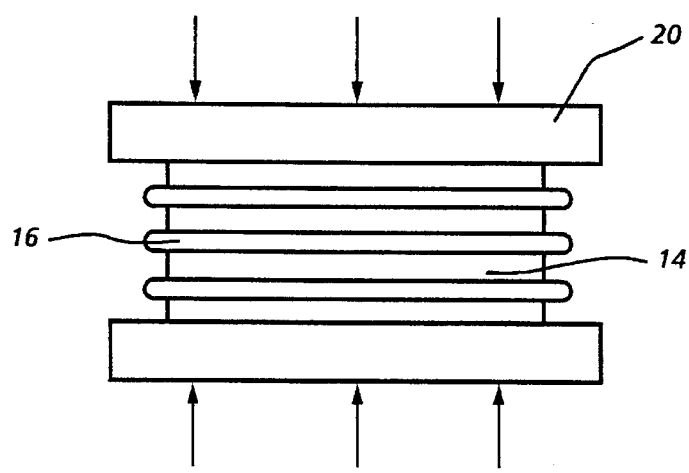
FIG. 3 is an elevation view of an edge portion of the structural sheet laminate of FIGS. 1 and 2 undergoing a critical step in its fabrication process.

In accordance with one embodiment of the invention, the requisite thinness of the fluid layers 16 is achieved during the sheet fabricating process by placing a partially formed sheet laminate between the plates 20 of a pressure clamp as shown in FIG. 3. The viscous fluid may thereby be squeezed out between the rigid layers 14 until the desired thickness for layers 16 is achieved.

In order to perform its flexure preventing and vibration overdampening function, the viscous fluid of layers 16 must be maintained in layered alignment between the rigid layers 14. Toward that end, conventional bonding material 22 is peripherally applied between the rigid layers 14 at the exposed edge portions 12 of sheet 10, in the embodiment as shown in FIG. 2. The viscous fluid of layers 16 is thereby confined in a non-pressurized state to the space between confronting surfaces 18 of adjacent rigid layers 14.

Numerous other modifications and variations of the present invention are possible in light of the foregoing teachings. It is therefore to be understood that within the scope of the appended claims the invention may be practiced otherwise than as specifically described.

What is claimed is:

1. A composite structural sheet including at least two rigid layers having confronting shear surfaces, said layers being individually made of a composition undergoing flexural deformation in response to forces applied, adhesive disposed between said confronting surfaces of the rigid layers for dampening vibration transversely of said confronting surfaces induced by impact of said forces applied thereto and sealing material confining the adhesive in layered alignment between the rigid layers for enabling said dampening of the vibration thereof.

2. The combination of claim 1 wherein said adhesive is a film of non-pressurized viscous liquid in contact with said two rigid layers.

3. The combination of claim 2 wherein said film is less than 0.001 inch in thickness.

4. A relatively thin structural laminate sheet specifically designed to prevent vibration transversely thereof induced by impact of forces thereon, including at least two layers of rigid material which respectively undergo flexural deformation in response to said forces, a viscous fluid separating said layers of the rigid material and peripheral bonding material adhering to both of said two layers of the rigid material for confining the viscous fluid to an intermediate layer in direct contact with said two layers of the rigid material to dampen the transverse vibration induced by said impact of the forces causing said flexural deformation of the two layers of the rigid material.

5. The structural laminate sheet as defined in claim 4 wherein said viscous fluid is a vibration dampening film maintained in layered alignment between and in contact with said two layers of the rigid material for resisting said transverse vibration of the laminate sheet.

6. The combination of claim 5 wherein said film is less than 0.002 inch in thickness to minimize total thickness of the laminate sheet.

7. The combination of claim 5 wherein said viscous fluid is a non-pressurized adhesive liquid having a vibration overdampening property with respect to said flexural deformation of the layers of the rigid material.

8. The combination of claim 1 wherein said sealing material is bonded to both of said rigid layers in peripheral enclosing relation to spacing between the confronting surfaces thereof, said adhesive means comprising viscous fluid completely occupying said peripherally enclosed spacing between the confronting surfaces of the rigid layers to form a film having a vibration over dampening property.

* * * * *